(12) United States Patent
Gangopadhyay et al.

(10) Patent No.: US 12,215,029 B2
(45) Date of Patent: Feb. 4, 2025

(54) GRAPHITE PURIFICATION SYSTEM AND METHOD

(71) Applicant: URBIX, INC., Mesa, AZ (US)

(72) Inventors: Palash Gangopadhyay, Chapel Hill, NC (US); Jillian Grass, Phoenix, AZ (US); Jan Segura Schreiber, Hamburg (DE); Benjamin Shane Riggs, San Tan Valley, AZ (US)

(73) Assignee: Urbix, Inc., Mesa, AZ (US)

( * ) Notice: Subject to any disclaimer, the term of this patent is extended or adjusted under 35 U.S.C. 154(b) by 0 days.

(21) Appl. No.: 18/615,406

(22) Filed: Mar. 25, 2024

(65) Prior Publication Data

US 2024/0228299 A1 Jul. 11, 2024

Related U.S. Application Data

(63) Continuation of application No. PCT/US2023/070928, filed on Jul. 25, 2023.
(Continued)

(51) Int. Cl.
*C01B 32/215* (2017.01)
*F27D 3/00* (2006.01)
(Continued)

(52) U.S. Cl.
CPC .......... *C01B 32/215* (2017.08); *F27D 3/0033* (2013.01); *F27D 11/06* (2013.01);
(Continued)

(58) Field of Classification Search
CPC ..... C01B 32/205; C01B 32/215; F27D 19/00; F27D 11/06; F27D 3/0033; F27D 2009/0002; F27D 2019/0003
See application file for complete search history.

(56) References Cited

U.S. PATENT DOCUMENTS

| 2,780,527 A | 2/1957 | Marisic et al. |
| 2,891,782 A | 6/1959 | Blackman et al. |

(Continued)

FOREIGN PATENT DOCUMENTS

| CN | 204165403 U | * | 2/2015 | |
| CN | 205367734 U | * | 7/2016 | |
| WO | WO-9416993 A1 | * | 8/1994 | .............. B01J 19/02 |

OTHER PUBLICATIONS

The International Search Report, PCT/US 23/70928, Jan. 23, 2024.

*Primary Examiner* — Hung D Nguyen
(74) *Attorney, Agent, or Firm* — Womble Bond Dickinson (US) LLP

(57) ABSTRACT

A graphite purification system contains a vessel adapted to contain graphite particles, including an inductive coil for heating said vessel; and a cooling system for cooling said graphite purification system, whereby the cooling system is adapted to also cool the graphite particles. The purification system may be a continuous or batch system, and, the vessel may be at least partially formed from graphite. A process for purifying graphite particles is also presented and includes providing a vessel formed at least partially from graphite; loading graphite particles into the vessel; inductively heating at least a portion of the vessel, and thereby heating the graphite particles in physical contact with the vessel; and cooling the vessel and the graphite particles.

20 Claims, 17 Drawing Sheets

Related U.S. Application Data

(60) Provisional application No. 63/369,275, filed on Jul. 25, 2022.

(51) Int. Cl.
 *F27D 11/06* (2006.01)
 *F27D 19/00* (2006.01)
 *F27D 9/00* (2006.01)

(52) U.S. Cl.
 CPC ...... *F27D 19/00* (2013.01); *F27D 2009/0002* (2013.01); *F27D 2019/0003* (2013.01)

(56) References Cited

U.S. PATENT DOCUMENTS

| | | |
|---|---|---|
| 5,377,495 A | 1/1995 | Daigle |
| 5,419,889 A | 5/1995 | Matsumoto et al. |
| 2008/0267251 A1 | 10/2008 | Gerszewski et al. |
| 2010/0163550 A1* | 7/2010 | Belsh ...................... F27D 21/00 373/6 |
| 2013/0038002 A1 | 2/2013 | Al-Mutairi |
| 2013/0142212 A1 | 6/2013 | Matsuda et al. |
| 2016/0215218 A1 | 7/2016 | Hill et al. |
| 2019/0210882 A1 | 7/2019 | Bowes et al. |

\* cited by examiner

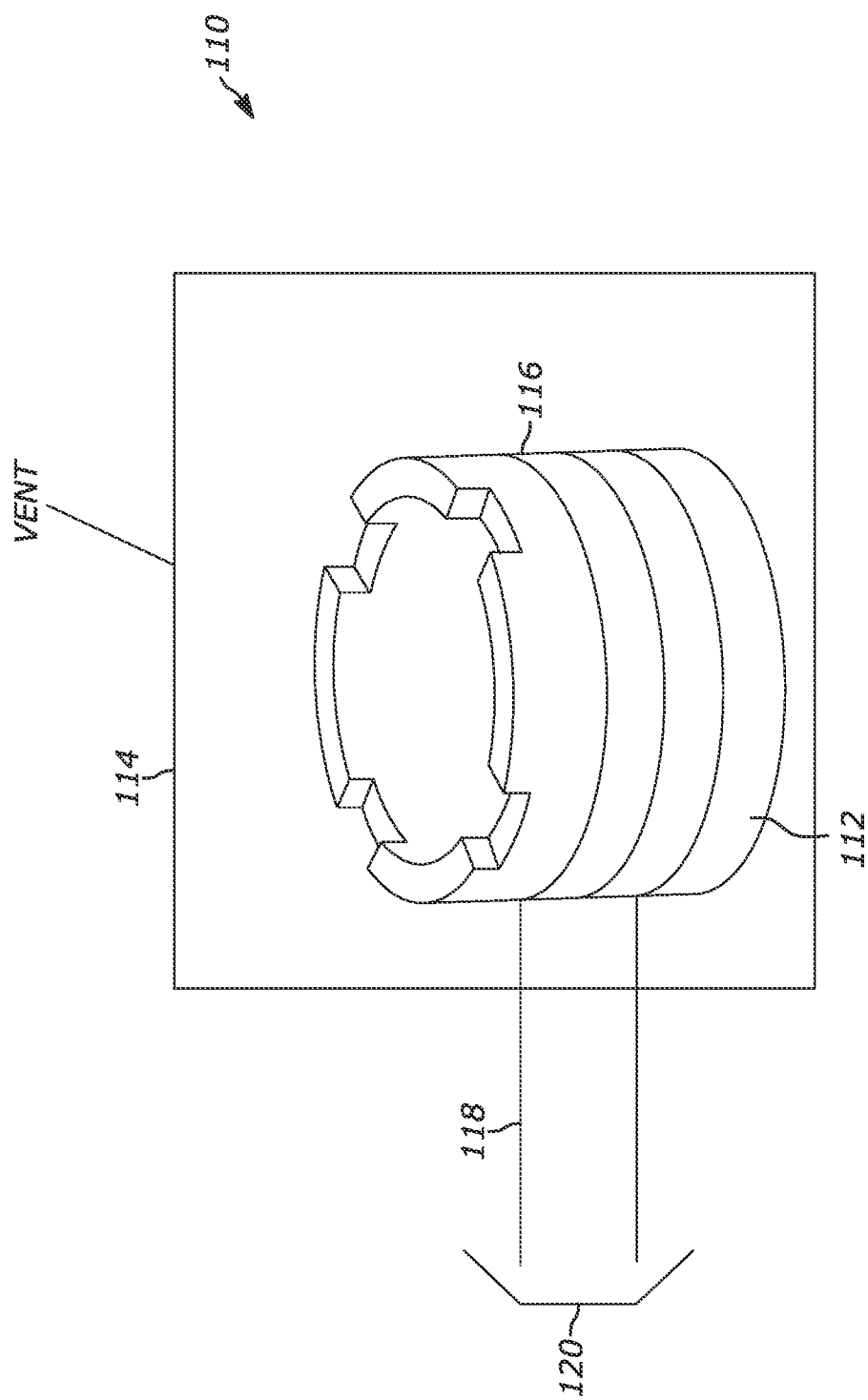

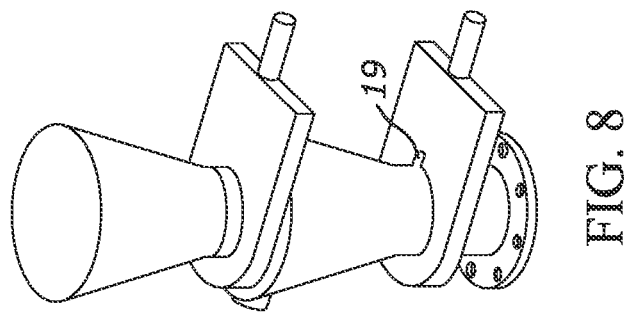
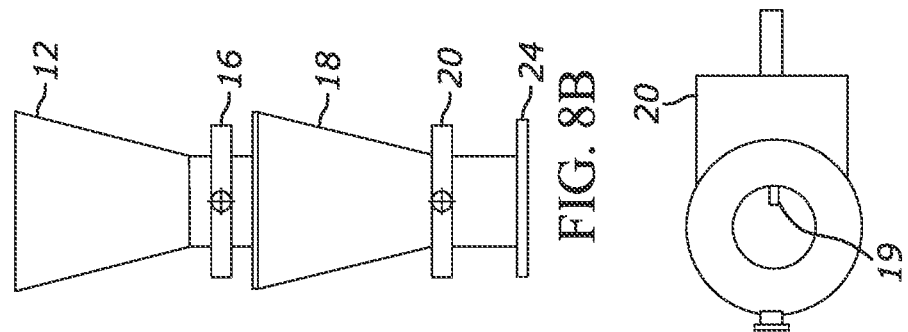
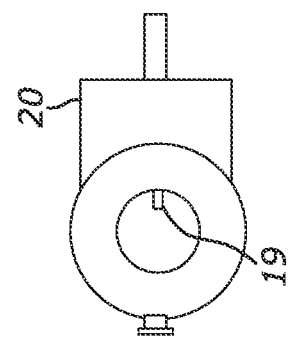
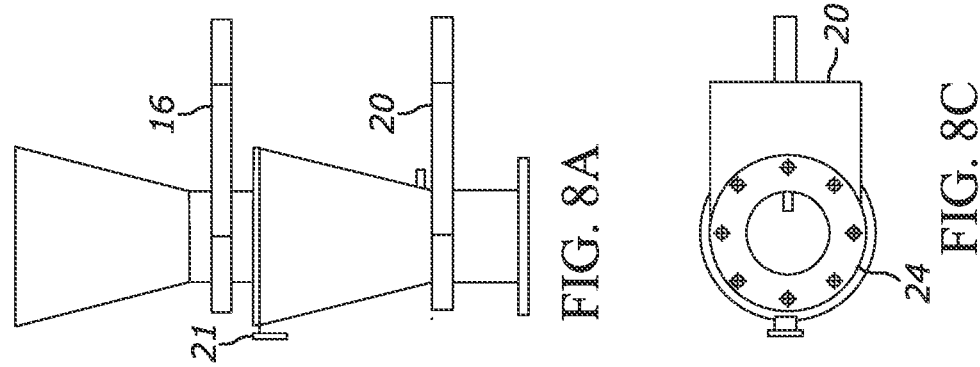

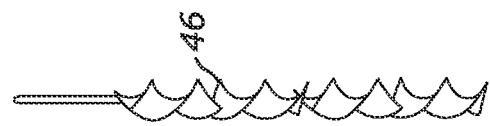
FIG. 16C
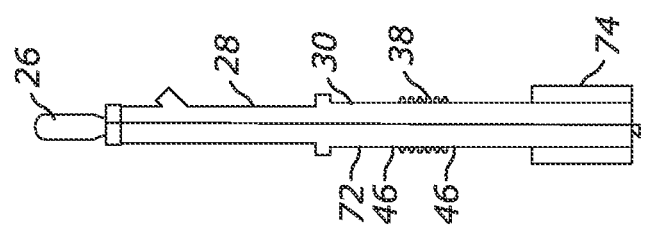
FIG. 16B
FIG. 16A
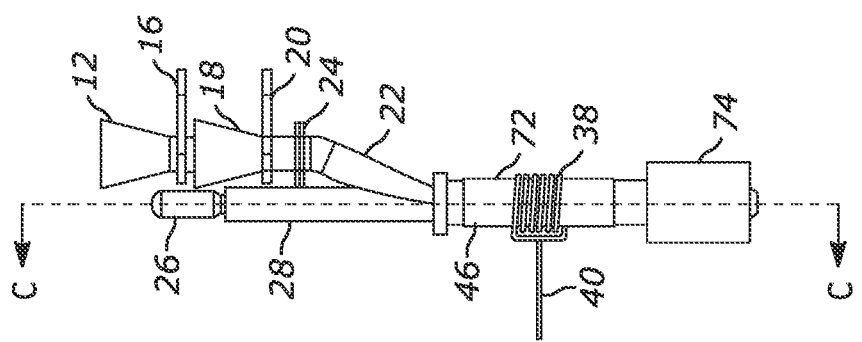
FIG. 16

GRAPHITE PURIFICATION SYSTEM AND METHOD

CROSS-REFERENCE TO RELATED APPLICATIONS

This application is based on and claims the benefit of PCT Application No. PCT/US2023/070928, having a filing date of Jul. 25, 2023, which is based on and claims the benefit U.S. Provisional Patent Application No. 63/369,257, entitled "Graphite Purification System and Method" having a filing date of Jul. 25, 2022, the teaching of each is hereby incorporated by reference in its entirety.

FIELD OF THE INVENTION

The present invention relates to graphite purification systems and methods, and more particularly, to furnaces heated by magnetic induction, that exhibit greater efficiency when converting electrical energy into usable heat energy.

BACKGROUND OF THE INVENTION

With the advent of improvements in batteries, as applied to electric motor vehicles, for example, graphite has been discovered as a useful conductor in these types of batteries. A key component of lithium-ion batteries is graphite, the primary material used for one of two electrodes known as the anode. Typically, when a battery is charged, lithium ions flow from the cathode to the anode through an electrolyte buffer separating these two electrodes.

To be useful, naturally occurring graphite must be processed to remove impurities such as those typically found in graphite ores. These impurities include metal hydrides, oxides, and metal silicates, for example. Milling processes typically mill graphite concentrates and then shape the graphite concentrates into spheroidized particles. The particles that have been spheroidized are, in certain processes, purified by a potentially environmentally damaging acid-leaching process. In many areas around the world, acid leaching processes have in fact, unfortunately, resulted in environmental degradation.

As an alternative, purification processes have been developed that exclusively use high-temperature furnaces. No environmentally damaging acid leaching or caustic bakes are employed, however, inherently high temperatures and inefficiency in cooling have resulted in increased energy costs as well as relatively lengthy purification process times. For example, resistive heating may be used in ovens whereby the graphite is heated in horizontally or vertically oriented batches, in an effort to remove impurities. But again, these processes are always a batch process and require relatively high temperatures and, relatively longer process times, and therefore relatively higher energy costs. Yet further, these processes require relatively lengthy equipment cool-down times, which increases the processing time. Accordingly, these types of challenges continue to incentivize improvement in the graphite purification industry.

SUMMARY OF THE INVENTION

A graphite purification system contains a vessel adapted to contain graphite particles; an magnetic inductive coil for heating said vessel; and a cooling system for cooling said graphite purification system, whereby the cooling system is adapted to also cool the graphite particles. The purification system may be a continuous or batch system, and the vessel may be at least partially formed from graphite. A process for purifying graphite particles is also presented and includes providing a vessel formed at least partially from graphite; loading graphite particles into the vessel; inductively heating at least a portion of the vessel and thereby heating the graphite particles in physical contact with the vessel; and cooling the vessel and the graphite particles.

The cooling system may contain a vertical column operably connected to the vessel, for vertical flow of graphite particles through the purification system; a cooling jacket encasing at least a portion of the vertical column; and a coolant circulated through the cooling jacket.

BRIEF DESCRIPTION OF THE DRAWINGS

FIG. 4 is a first schematic view of a batch purification system in accordance with the present invention.

FIG. 8 is a perspective view of the first and second hoppers in a vertical continuous graphite purification system, in accordance with the present invention.

FIG. 8A is a side view of the hoppers of FIG. 8.

FIG. 8B is a front view of the hoppers of FIG. 8.

FIG. 8C is a bottom view of FIG. 8, showing the connection flange.

FIG. 8D is a bottom view of FIG. 8, illustrating the inert gas inlet for the second hopper.

FIG. 16 illustrates a side view of the vertical continuous graphite purification system of FIG. 1.

FIG. 16A illustrates one embodiment of the mixer or conveyor of the vertical continuous graphite purification system of FIG. 1.

FIG. 16B illustrates a sectional view of the vertical continuous graphite purification system of FIG. 16.

FIG. 16C illustrates a second embodiment of the mixer or conveyor of the vertical continuous graphite purification system of FIG. 16.

DETAILED DESCRIPTION OF THE INVENTION

Non-Limiting Definitions

Figure 1:
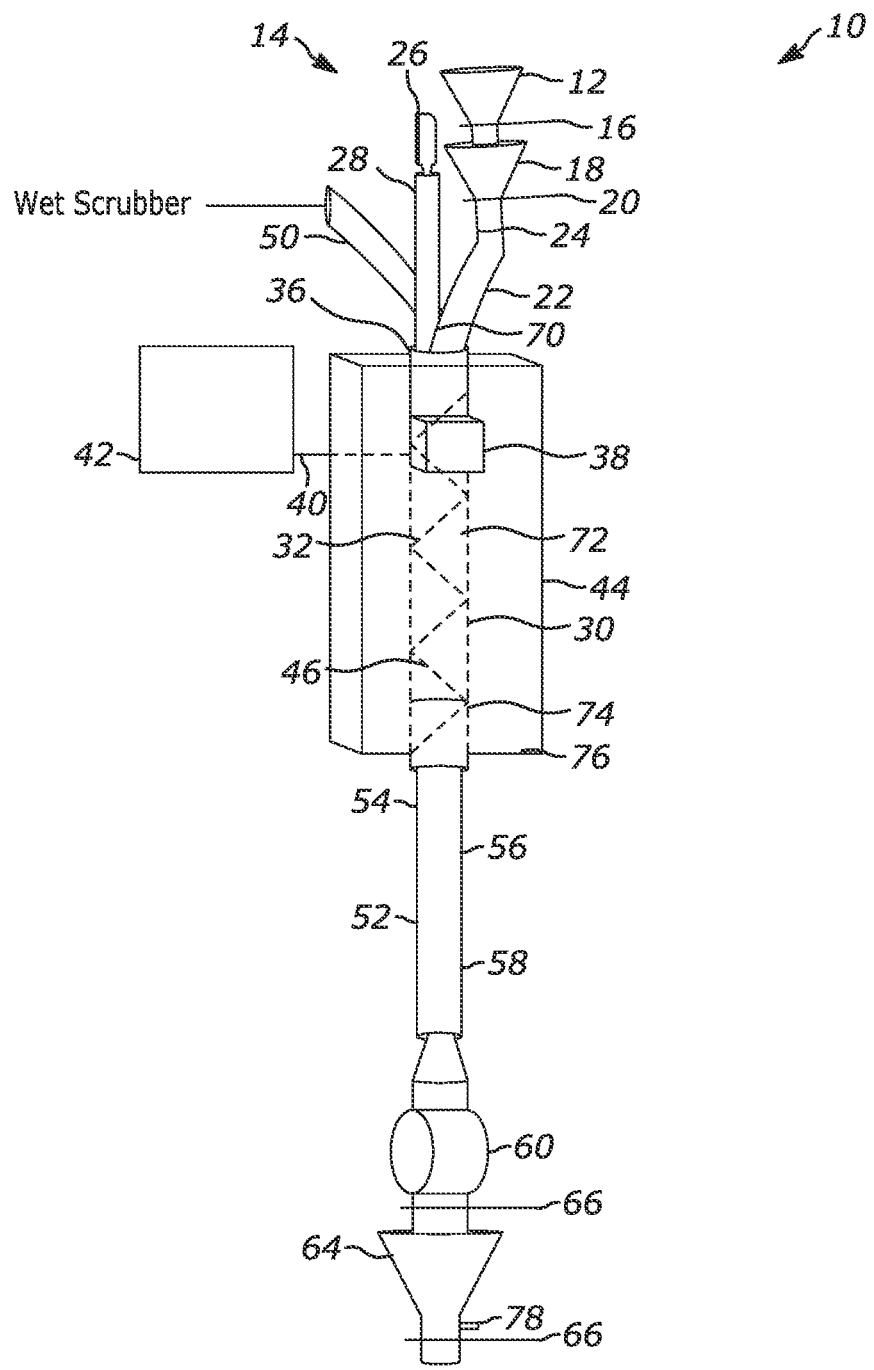
FIG. 1 is a first exemplary embodiment of a vertical continuous graphite purification system, in accordance with the present invention.

The terms "a", "an" and "the" are intended to include the plural forms as well unless the context clearly indicates otherwise.

The term "about" or "approximately" applies to all numeric values, whether or not explicitly indicated. These terms generally refer to a range of numbers that one of skill in the art would consider equivalent to the recited values (i.e., having the same function or result). In many instances, these terms may include numbers that are rounded to the nearest significant figure.

The term "adapted to" describes the hardware, software, or a combination of hardware and software that is capable of, able to accommodate, to make, or that is suitable to carry out a given function.

The term "another", as used herein, is defined as at least a second or more.

The phrase "associated with," as well as derivatives thereof, can mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

The phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The term "communicate," as well as derivatives thereof, encompasses both direct and indirect communication.

The terms "comprises" and/or "comprising", when used in this specification, specify the presence of stated features, steps, operations, elements, and/or components but do not preclude the presence or addition of one or more other features, integers, steps, operations, elements, components, and/or groups thereof.

The term "configured to", describes the hardware, software, or a combination of hardware and software that is adapted to, set up, arranged, built, composed, constructed, designed, or that has any combination of these characteristics to carry out a given function.

The term "coupled", is defined as "connected," although not necessarily directly and not necessarily mechanically.

The terms "including" and "having," as used herein, are defined as comprising (i.e., open language).

The term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The terms "substantial" and "substantially" means, when comparing various parts to one another, that the parts being compared are equal to or are so close enough in dimension that one skill in the art would consider the same. Substantial and substantially, as used herein, are not limited to a single dimension and specifically include a range of values for those parts being compared. The range of values, both above and below (e.g., "+/−" or greater/lesser or larger/smaller), includes a variance that one skilled in the art would know to be a reasonable tolerance for the parts mentioned.

Note that not all of the activities described above in the general description or the examples are required, that a portion of a specific activity may not be required, and that one or more further activities can be performed in addition to those described. Still further, the order in which activities are listed is not necessarily the order in which they are performed.

Vertical Continuous Throughput System

Figure 2:
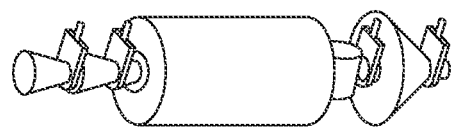
FIG. 2 is a perspective view of a second exemplary embodiment of a vertical continuous graphite purification system, in accordance with the present invention.
Figure 2B:
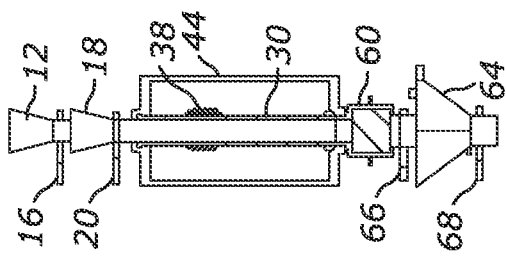
FIG. 2B is a sectional view taken along the line B-B of FIG. 2A.
Figures 2A, 2C, 2D:
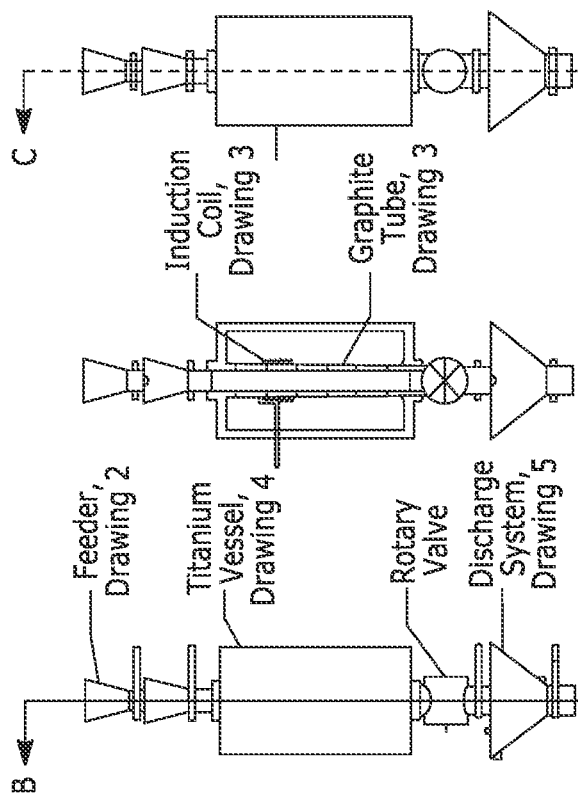
FIG. 2A is a side view of the embodiment of FIG. 2.
FIG. 2C is a front view of the embodiment of FIG. 2.
FIG. 2D is a sectional view taken along the line C-C of FIG. 2C.
Figure 2F:
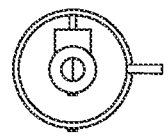
FIG. 2F is a bottom view of FIG. 2C.
Figure 2E:
FIG. 2E is a bottom view of FIG. 2A.

In a first embodiment of the invention, and as shown in FIG. 1, a vertical feed furnace 10, preferably heated by magnetic induction, is provided. In accordance with the present invention, the heating, purification, and cooling of graphite particles, such as spheroidized graphite particles, are enhanced by the vertical graphite feed system or vertical feed furnace 10. The vertical graphite feed system 10 may also be a continuous vertical graphite feed system 10, as shown in FIGS. 1, 2, and 8, for example. It will be appreciated that a graphite mass flow rate defined by a mass unit over time may be iteratively determined based on the inductive heat applied, as explained below, and based on predetermined desired levels of purity. An exemplary mass flow rate is provided at 5 kg per hour. It will be appreciated that as design criteria are optimized, the mass flow rate may change based on design variables.

As exemplified in FIGS. 1, 2, and 8, a first feed hopper or a first open-air hopper 12 is preferably conically shaped and positioned at a top end 14 of the furnace 10, for receipt of spheroidized graphite, as fed into the top of the first open-air hopper 12 or first feed hopper 12. A first slide gate 16 is positioned at the bottom of the first feed hopper 12, to automatically or manually, modulate and facilitate the gravitational transfer of graphite particles through the first feed hopper 12.

A second feed hopper 18 or a second environmentally controlled hopper 18 is also preferably conically shaped, environmentally controlled, and operably sealed, and is positioned immediately below the first feed hopper 12, whereby graphite particles flowing from the first feed hopper 12 flow through the first slide gate 16 into the top of the second feed hopper 18, for processing therein. A vacuum flange 21 may be provided at the top of the second feed hopper 18, to facilitate environmental control of the second feed hopper 18. An oxygen-scavenger, such as charred ascorbic acid, for example, may be integrated within the second feed hopper 18 such that as graphite particulate is passed through a bed of the charred ascorbic acid, for example, oxygen is at least reduced or removed from the graphite particulate flow prior to entering the furnace below. The reaction of graphite and oxygen is therefore eliminated or at least mitigated. As shown in FIG. 8, an inert gas may be injected into the second feed hopper 18 through an inert gas inlet 19 to assist in fluidizing the graphite particles as they flow through the hopper 18. A second slide gate 20 is positioned at the bottom of the second feed hopper 18, to automatically or manually, modulate and facilitate the gravitational transfer of graphite particles, through the second feed hopper 18.

Again, referring to FIGS. 1 and 8, a flow tube or conduit 22 operatively communicates with the second slide gate 20 during the operation of system 10, thereby facilitating the gravitational flow of the graphite particles exiting the second feed hopper 18 to the system below. As shown in FIGS. 1 and 8, a first connection flange 24 is attached to the bottom of the second feed hopper 18, for connecting the second feed hopper 18 to the flow tube 22 thereby facilitating the flow of the graphite particles therethrough. Alternatively, in another exemplary embodiment, as shown in FIGS. 2 and 8-10, the connection flange 24 may instead be directly connected to the vertical column or graphite feed tube 30 thereby again facilitating flow of the graphite particles therethrough.

In the exemplary embodiment of FIG. 1, a mixer motor 26 is spaced radially outwardly from the first feed hopper 12, and is fixed within the structure 10 for rotatably operating a mixer as described below. A second flow tube or conduit 28 supports the motor 26 and extends downwardly along the hoppers 12 and 18, thereby facilitating operable communication of the motor 26 with a mixer as described below. As further shown in FIG. 1, a junction 70 is defined at the intersection of the first and second conduits 22 and 28, respectively, whereby the interiors of each conduit overlap each other in operable communication thereof.

Figure 11:
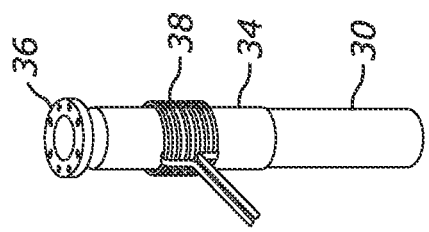
FIG. 11 illustrates a perspective view of an exemplary inductive coil and heater of the vertical column of the present invention.
Figure 11C:
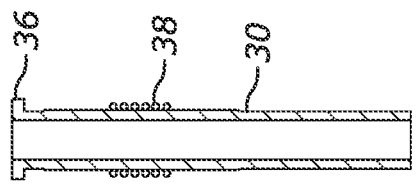
FIG. 11C is a sectional view of the graphite tube or vertical column of FIG. 11.
Figure 11B:
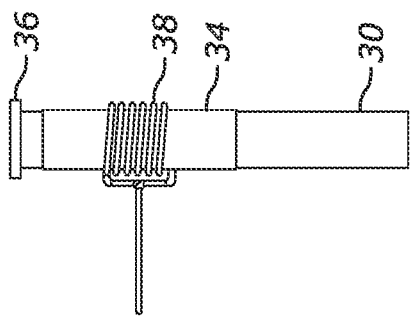
FIG. 11B is a second side view of the graphite tube or vertical column of FIG. 11, emphasizing the inductive coil.
Figure 11E:
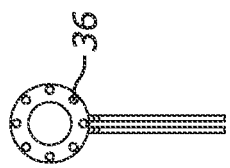
FIG. 11E is an upper view of the connection flange of the graphite tube or vertical column of FIG. 11, also schematically illustrating the power connection to the inductive coil.
Figure 11A:
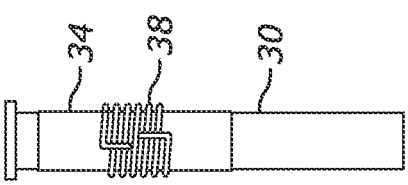
FIG. 11A is a side view of the graphite tube or vertical column of FIG. 11.
Figure 11D:
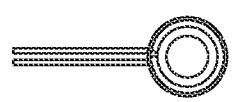
FIG. 11D is a schematic view of the electrical connection of the power supply to the inductive coil of the graphite tube or vertical column of FIG. 11.

Again, with reference to the exemplary embodiment of FIG. 1 and also FIG. 11, a graphite feed tube 30 extends from and is operably connected by a second flange 36 to a bottom end or connection flange 24 of the second flow tube 26, thereby providing a vertically oriented interior plenum 32 defined by the graphite feed tube 30. Alternatively, with reference to FIGS. 2 and 11, the graphite flow tube 30 may instead be connected by the second flange 36 directly to the second feed hopper 18.

Again, referring to FIG. 1, FIG. 11, and FIGS. 11A-11E, graphite particulate flow may be channeled from the first tube 22 into the graphite feed tube 30 for heating of the graphite particulate flow therein. An insulating material 34, such as zeolite, is preferably coated about an upper portion 72 of the graphite tube 30, for reflecting and maintaining radial heat generated within the interior plenum 32. Additionally, a plurality of cooling/radiation fins 74 may be formed about a bottom portion 76 of the graphite feed tube 30, in coaxial relation to the graphite feed tube 30, for cooling of the graphite particulate as it passes through the bottom portion 76. For example, an exemplary magnetic inductive coil 38, which may be manufactured by Ultraflex Power Technologies out of New York or California, is coiled about the insulating material 34 for heating the interior plenum 32.

Figure 12:
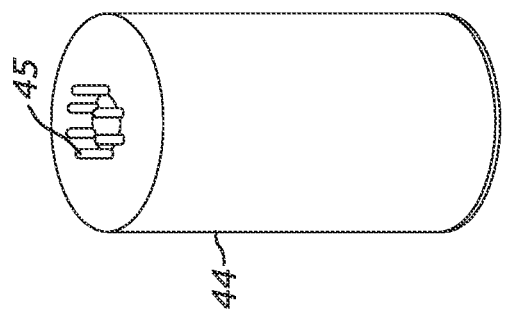
FIG. 12 illustrates a perspective view of an exemplary of the vertical column or graphite tube-feeder of the present invention.
Figure 12B:
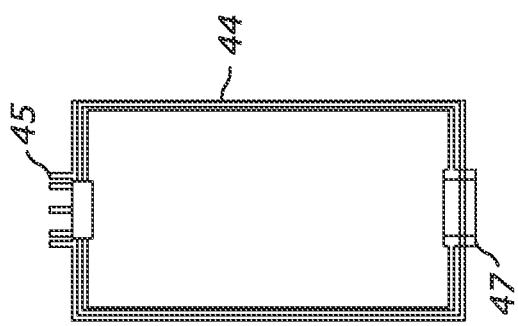
FIG. 12B is a sectional view of the vertical column or graphite tube feeder of FIG. 12.

As shown in FIGS. 1, 2, and 12, a jacketed titanium vessel 44 provides a cylindrical and annular housing positioned about the graphite feed tube 30, for cooling of the portions of the graphite feed tube 30 not heated by the coil 38. As further described below, a chiller may be connected to the jacketed vessel 44 for cooling thereof, in a known manner. A power line 40 extends through the titanium vessel 44 and provides electronic communication between a power supply 42 and inductive coil 38, for energizing the coil 38.

Figure 10:
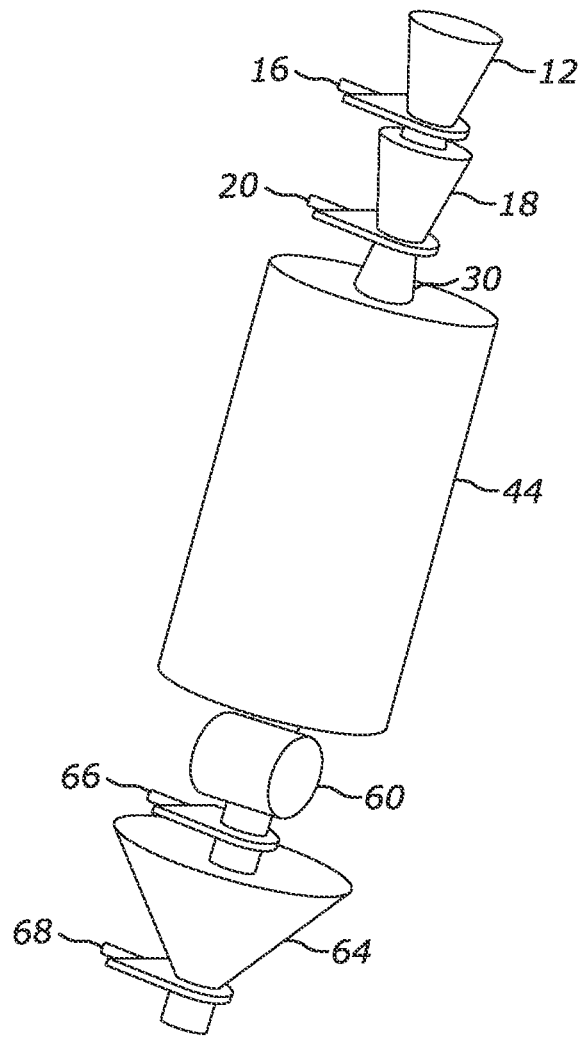
FIG. 10 is a perspective view of the embodiment of FIG. 2.
Figure 12D:
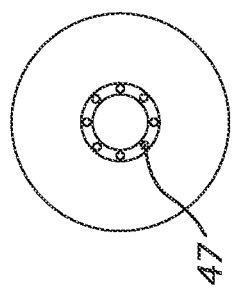
FIG. 12D is a bottom view of the vertical column or graphite tube feeder of FIG. 12.
Figure 12A:
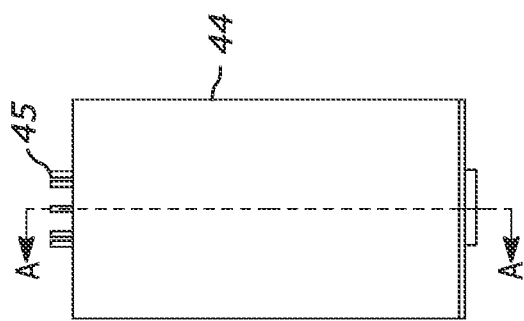
FIG. 12A is a side view of the vertical column or graphite tube feeder of FIG. 12.
Figure 12C:
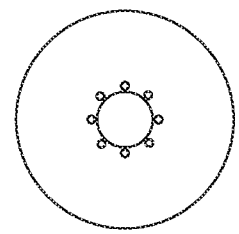
FIG. 12C is a top view of the vertical column or graphite tube feeder of FIG. 12.

Referring to FIG. 10 and FIGS. 12-12D, connection posts 45 extend from the top of the vessel 44 and the graphite tube feeder 30, for connecting the tube feeder to the flange 24 at the bottom of the second slide gate 20. A connection flange 47 is fixed at the bottom of the vessel 44, for fixing the vessel 44 and the graphite tube feeder 30 to the rotary valve 60.

Referring to FIG. 1, and with reference to the interior plenum 32, a rotary mixer/screw conveyor 46, actuated by the mixer motor 26, may be centrally disposed within the interior plenum 32 for transfer of the graphite particulate from the top to the bottom of the graphite feed tube 30. It will be appreciated that just as the graphite feed tube 30 is formed from graphite, the rotary mixer 46 is also preferably formed from graphite. It is believed that the graphite feed tube 30 and the rotary mixer 46, when formed from graphite, each function as a susceptor by absorbing the magnetic flux lines inherent in the inductive heating, and amplifies the reciprocal magnetic dipole activity, thereby enhancing and contributing to the heat generated within the upper portion 72 of the graphite feed tube 30. By enhancing the heat within the graphite feed tube 30 as applied to the graphite particles, the volatile organic compounds (VOCs) and the metallic impurities such as the metallic hydrides and metallic silicates are, but not by way of limitation, believed to be cooked off at about 500 C and about 1700 to 1800 C, respectively.

As further shown in FIG. 16, the rotary inline mixer 46 may be formed as an auger, and again, may be built containing graphite. It has been found that the rotary design and the graphite construction provides additional heating and more efficient heat transfer to the graphite powder, and also assist in mixing the graphite powder with inert or other reactive gases. The mixer 46 facilitates thorough agitation of the graphite powder during heating at high temperature.

Again, as schematically shown in FIG. 1, a third exhaust tube 50 also partially defines the junction 70 and extends upwardly from the second tube or conduit 28, such that the graphite feed tube 30, the second tube 28, and the third exhaust tube 50 fluidly communicate to provide an exhaust of the volatilized impurities from the heated graphite particulate. Accordingly, VOCs and metal plasma vapor formed from the impurities being cooked off of the graphite particulate can be managed at a wet (e.g., aqueous) scrubber in fluid and operable communication with the exhaust tube 50. By exhausting or venting the VOCs and metal plasma liberated from the heated graphite feed tube 30, the metal silicates and hydrides and other impurities may be collected or otherwise managed at the scrubber in a known manner.

Referring to FIG. 1, a jacketed cooling tower 52 may be connected to the bottom of the graphite feed tube 30, whereby the graphite particulate exiting the graphite feed tube 30 is immediately cooled in several stages defined in the cooling tower 52. Although not by limitation, a first upper stage 54 of the jacketed cooling tower 52 may provide fluid flow of a coolant such as water in and out of the jacketed cooling tower 52. A second interim stage 56 of the cooling tower 52 may provide temperature control of the graphite particulate (e.g., by a thermocouple). Stated another way, a graphite particle temperature controller 51, such as a thermocouple, may be contained within the purification system, in operable communication with the cooling jacket of the jacketed cooling tower 52, for example, to measure the temperature of the graphite particle flow, thereby regulating flow of the coolant as determined by preset control settings. A third bottom stage 58 of the cooling tower 52 may provide regulation of the fluid flow of coolant into and out of the cooling tower 52. It will be appreciated that the various stages of the cooling tower 52 may be interchanged so long as the cooling function is retained within the cooling tower 52.

Turing to FIG. 2 and FIGS. 2A-2F in another exemplary embodiment of the system 10, the cooling tower 52 may be omitted from the purification system 10, whereby cooling is affected by the transfer of the graphite particulates through unheated portions of the graphite feed tube 30 and then the transfer of the graphite particulates through the jacketed cooling discharge hopper as described below.

Figure 3:
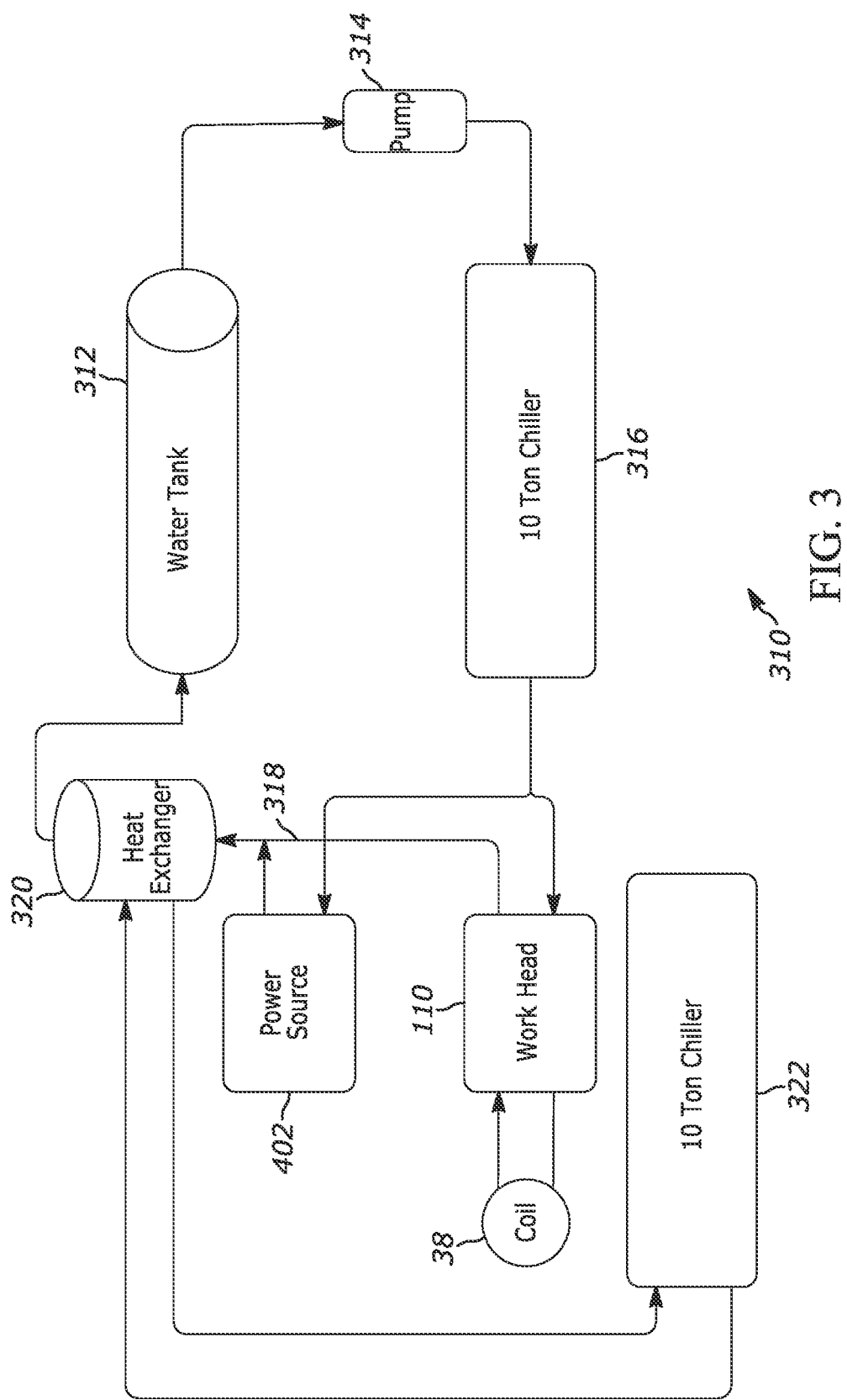
FIG. 3 is a first embodiment of a cooling system of the present invention.

With reference to FIG. 3, a schematic representation of an exemplary cooling system 310 in operative communication with the purification system 110 (or work head 110) is provided. A coolant reservoir 312, such as a water tank 312 for example, fluidly communicates with various components of the purification system 110 and the cooling system 310. As shown in FIG. 3, a pump 314 in fluid communication with the coolant reservoir 312, pumps coolant through the system 310. A 5-ton chiller 316 receives water or coolant from the coolant reservoir 312 and directly provides chilled coolant to the power source 42, the purification system 110, and the inductive coil 38, for cooling thereof. Heated coolant 318 is transferred from the power supply 42, the work head or purification system 110, the electric coil 38, and other sources of heat to a heat exchanger 320, for heat transfer and cooling of the coolant 318. A 10-ton chiller 322 fluidly communicates with the heat exchanger 320 to further cool system coolant 318 during operation of the system 110. Ultimately, chilled coolant 318 is then recirculated from chiller 322 back to the heat exchanger 320 for transfer back to the coolant reservoir 312, and recirculation back through the system 310.

Figure 14:
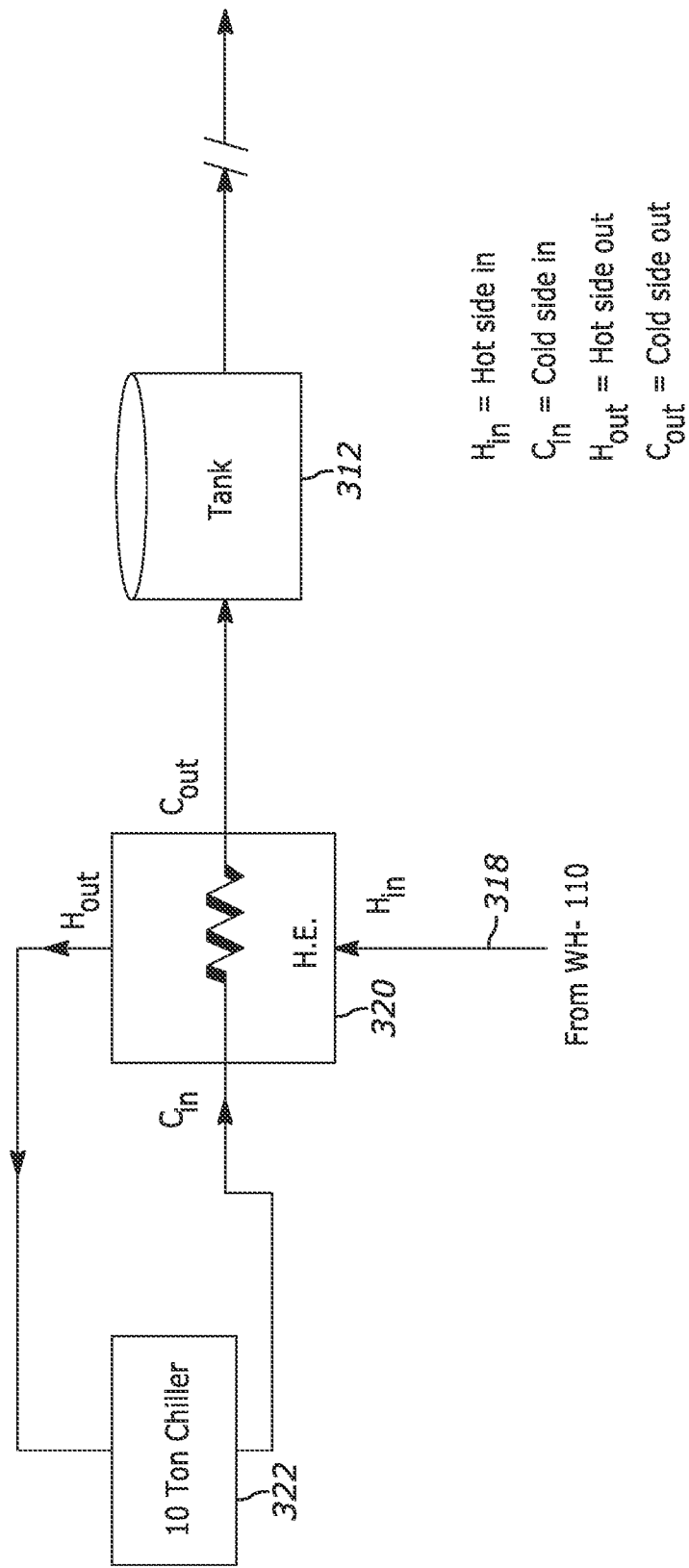
FIG. 14 illustrates a second exemplary cooling system in accordance with the present invention.

To further clarify the cooling system 310, a second exemplary embodiment of the cooling system 310 is shown in FIG. 14. As shown in FIG. 14, heated coolant 318 (H in) exiting the work head or purifying system 110 enters the heat exchanger 320 and after heat exchange (H out) enters the chiller 322 for cooling. After cooling, the coolant 318 again flows to and through heat exchanger 320 as coolant in (C in) and coolant out (C out). This cooled stream coming from the chiller 322 provides a coolant reservoir for thermodynamic communication with the coolant stream coming from the work head or purifying system 110. Coolant 318 (C out) exiting the heat exchanger 320 is then recirculated back to the tank 312, to again be drawn from as the cooling process continues.

Figure 15:
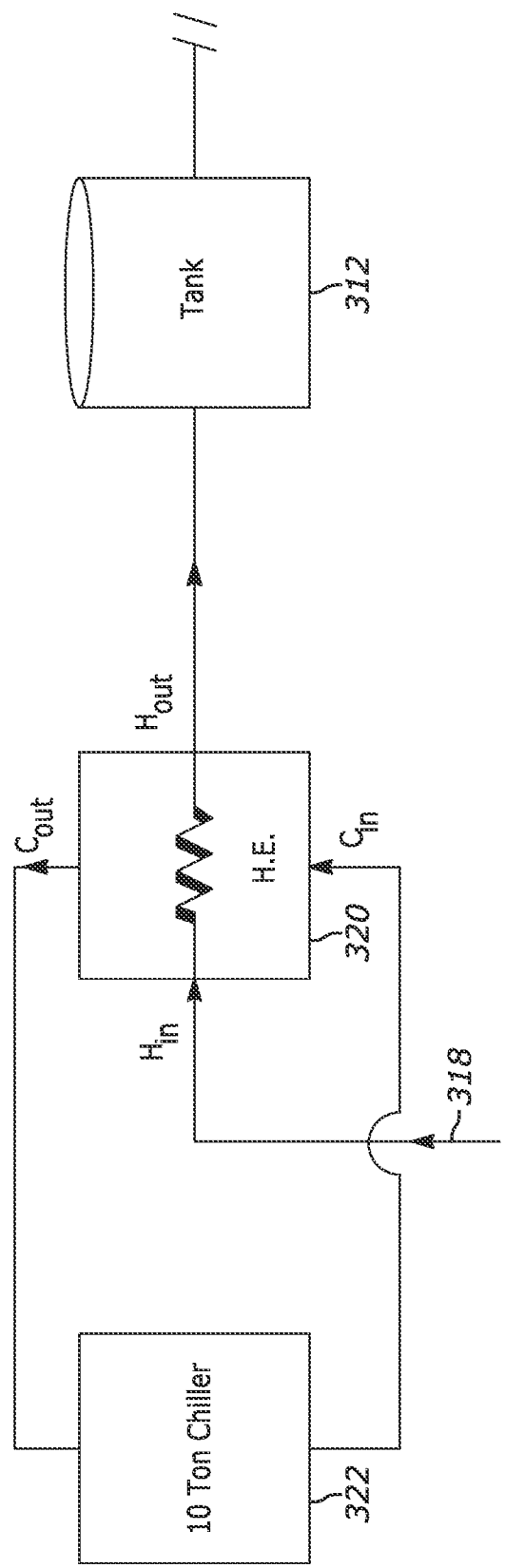
FIG. 15 illustrates a third exemplary cooling system in accordance with the present invention.

In yet another embodiment of the cooling system 310, a third exemplary embodiment of the cooling system 310 is shown in FIG. 15. As shown in FIG. 15, a heated coolant 318 (H in) enters the heat exchanger 320 and is cooled therein, and then exits as the "heated coolant out" (H out). The cooled "H out" is then recirculated back to the tank 312, to again be drawn from as the cooling process continues. A closed coolant loop 360 thermodynamically communicates with the heat exchanger 320 and is defined by a continuous stream of coolant in (C in) that is pumped from a 10-ton chiller 322 into the heat exchanger 320 to provide a continuous cooling reservoir in the heat exchanger 320. As heat is transferred to the "C in", it exits the heat exchanger 320 as coolant out (C out) to circulate back to the 10-ton chiller 322 for cooling therein. Once cooled, the coolant exits as "C in" to again provide cooling within the heat exchanger 320.

Figure 17:
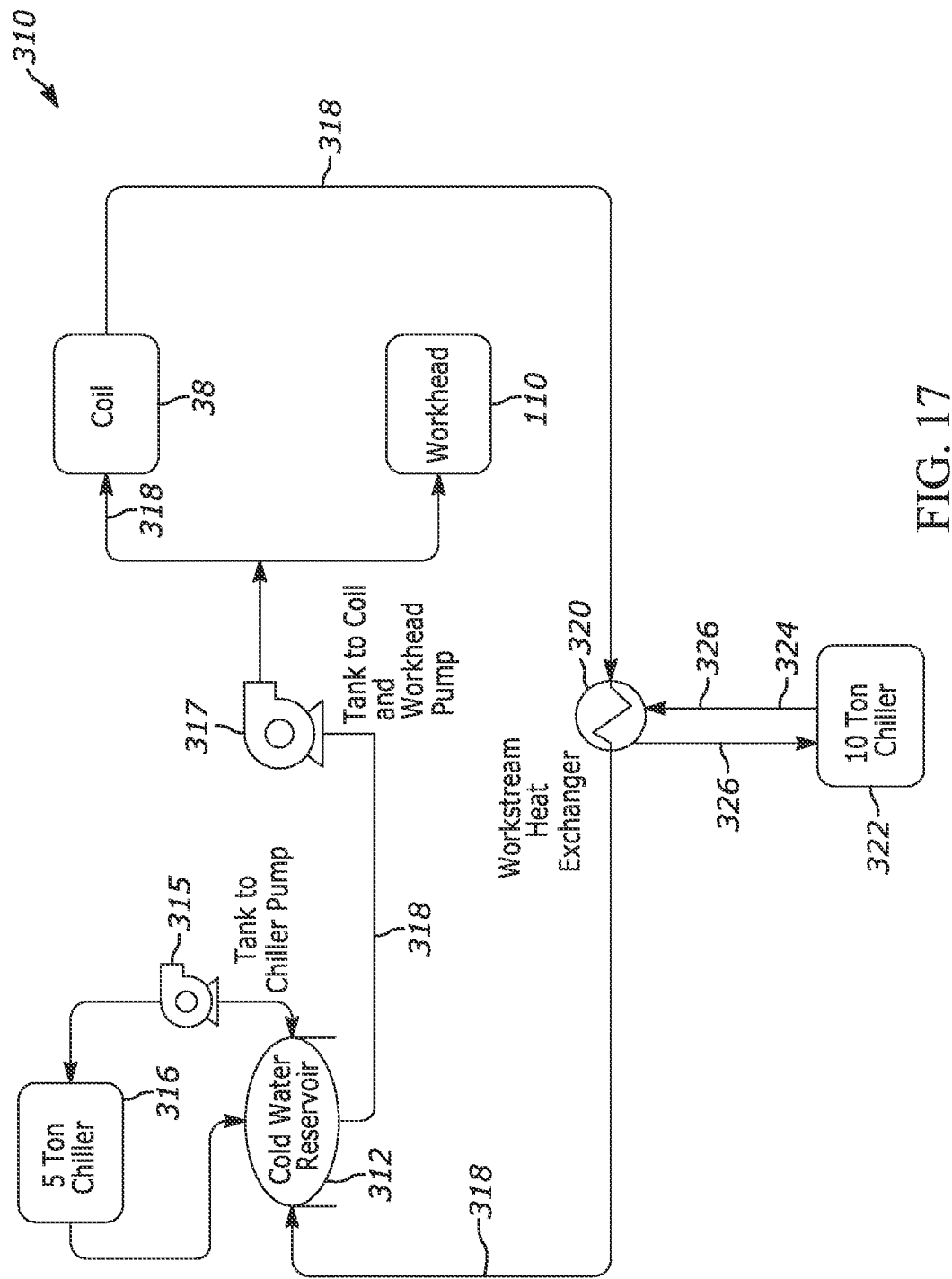
FIG. 17 illustrates a fourth exemplary cooling system in accordance with the present invention.

In yet another embodiment of the cooling system 310, a fourth exemplary embodiment of the cooling system 310 is shown in FIG. 17. A 5-ton chiller 316 fluidly and thermodynamically communicates with a coolant 318 and a cool water reservoir 312. A first chiller pump 315 pumps the coolant 318 (e.g., water) to and from the cold-water reservoir or tank 312 to facilitate cooling of the water 318, thereby maintaining a continuous cool temperature for system 110 operation. A second pump 317 pumps water 318 from the cool water reservoir 312 into the coil 38 and the work head or purification system 110. As the coolant 318 exits the coil 38 it is continuously pumped into a heat exchanger 320 for heat transfer therein. A second coolant 324 is pumped from a 10-ton chiller 322 to the heat exchanger 320, for cooling of the system coolant 318. As shown in FIG. 17, as the second coolant 324 is pumped in a closed loop 326 defined between the heat exchanger 320 and the 10-ton chiller 322, the 10-ton chiller 322 thermodynamically communicates with the heat exchanger 320, thereby facilitating heat transfer between the system coolant 318 and the second coolant 324. The second coolant 324 is therefore cooled as it is pumped from the heat exchanger 320 back into the 10-ton chiller 322.

Referring again to FIG. 1, a rotary valve 60 is fluidly and operably connected to the bottom end of the cooling tower 52, for controlled release of the purified graphite particulate flow moving therethrough. Although not shown, the rotary valve 60 may be controlled by a variable frequency drive (VFD) in a known manner. A third slide gate 66 is contained at the bottom of the rotary valve 60 and is used to automatically or manually, modulate and facilitate the gravitational transfer of graphite particles, through the rotary valve 60.

Figure 13C:
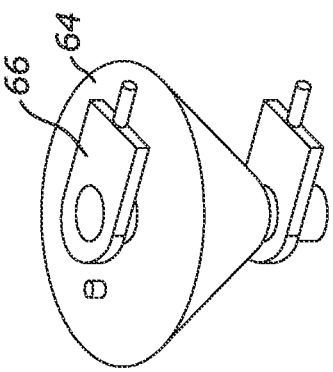
FIG. 13C is a sectional view of the jacketed cooling funnel taken along line A-A of FIG. 13B.
Figure 13B:
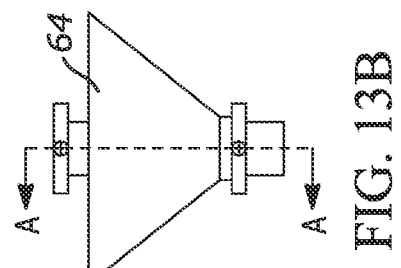
FIG. 13B is a rear view of the jacketed cooling funnel of FIG. 13.
Figure 13A:
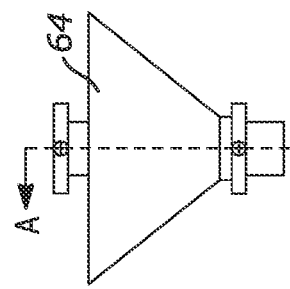
FIG. 13A is a side view of the jacketed cooling funnel of FIG. 13.
Figure 13E:
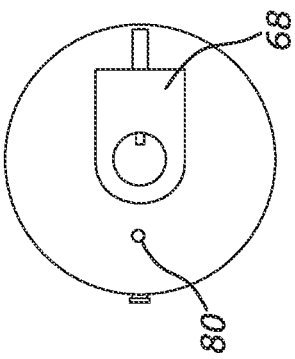
FIG. 13 is a perspective view of an exemplary jacketed cooling funnel of the present invention.
FIG. 13D is a top view of the vacuum flange fixed to the top of the jacketed cooling funnel of FIG. 13E is a bottom view of the jacketed cooling funnel of FIG. 13.
Figure 13D:
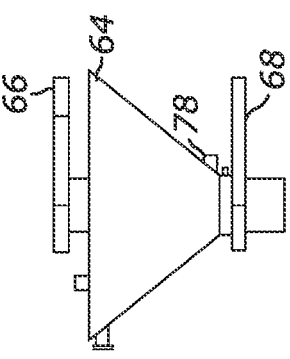
Figure 13:
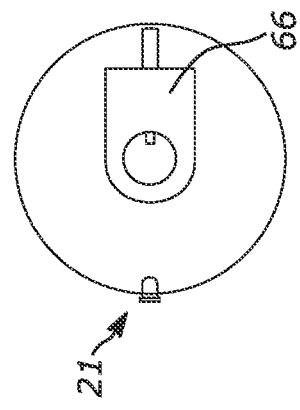

As shown in FIGS. 1, 2, and 13-13E, a jacketed discharge hopper 64, also preferably conically shaped, is connected to the bottom of rotary valve 60. Again, just as with the cooling tower 52, the discharge hopper 64 also fluidly communicates with a cooling source, such as a heat exchanger or chiller, to facilitate efficient and quick cooling of the purified graphite particles. A coolant inlet 78 fluidly communicates with the discharge hopper 64 to provide cooling of the graphite particulates flowing therethrough. A coolant outlet 80 located proximate to the fourth slide gate 68 (see below) provides discharge of the coolant or water from the hopper 64. As shown in FIG. 13, a second gas inlet 65 malfunction to inject inert gas into the graphite flowing through the discharge hopper 64, to assist in evacuating the graphite particles therefrom. A fourth slide gate 68 is contained at the bottom of the discharge hopper 64 and is used to automatically or manually, modulate and facilitate the gravitational transfer of the purified graphite spheroidized particles from the system 10.

As indicated above, the hoppers 12, 18, and 64 may be formed from stainless steel or other suitable materials. The slide gates 16, 20, 66, and 68 may be formed from stainless steel or other suitable materials. The jacketed titanium vessel 44 may of course, be formed from titanium. All tubes or conduits may also be formed from stainless steel, with the exception of the graphite feed tube 30. As stated above, the rotary mixer/conveyor 46 and the graphite feed tube 30 may be molded or metal-formed from graphite to provide the enhanced heating benefits as described above. Known control systems may be utilized to affect automatic control of the system 10 in a known manner.

Batch System

In further accordance with the present invention, and as exemplified in FIGS. 4-7, graphite particles may be heated up within a crucible in a batch system 110. As shown in FIG. 7A, first crucible 112 is contained within a ventilated oven 114 for inductive heating of the vessel or crucible 112 (the heated vessel). An inductive coil 116 is coiled about the vessel or crucible 112 for heating of the crucible 112. A power line 118 connects a power supply 120 to the coil 116, thereby providing inductive heat to the crucible 112. As shown in FIG. 7B, copper tubes 117 house the electric line 118, and are fixed to the oven 114 by compression fittings 115 for copper tubing. A mounting flange 113 is glued to a gasket 123 that is glued or otherwise fixed to the oven 114. Respective plexiglass tubes 119 extending through the mounting flange 113, may be contiguously fixed to each of the copper tubes 117, extending into the oven 114, thereby providing a continuous conduit for the electric lines 118 powering the inductive coil 116 for heating the crucible 112. As with the graphite feed tube 30 in the vertical continuous throughput system 10, the crucible 112 is preferably made from graphite, thereby also harnessing the heat advantage of reciprocating the magnetic dipoles as the magnetic flux is sinusoidally generated. As the magnetic dipoles are alternated by AC current, the resultant sinusoidal energy pattern creates an internal friction for the graphite-containing crucible, and for the graphite-containing particulate, thereby providing a substantial improvement in heat efficiency.

Figure 5B:
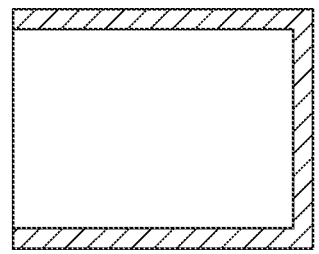
FIG. 5B is a sectional view of the batch purification system in a stacked configuration.
Figure 5:
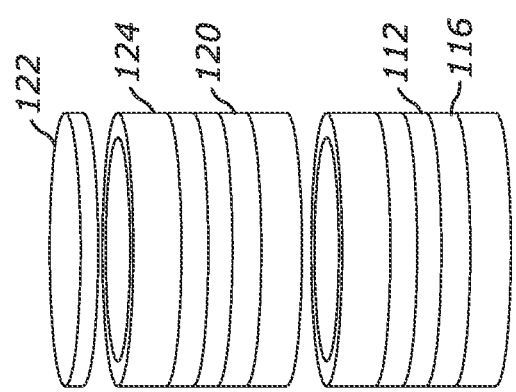
FIG. 5 is a perspective and exploded view of a second exemplary batch purification system in accordance with the present invention.
Figure 5A:
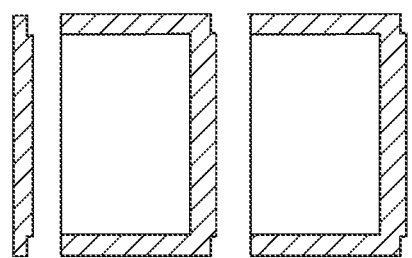
FIG. 5A is a sectional view of the batch purification system of FIG. 5.
Figure 6B:
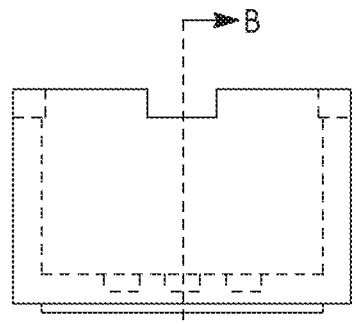
FIG. 6B is a side view of the batch purification system of FIG. 6A.
Figure 6C:
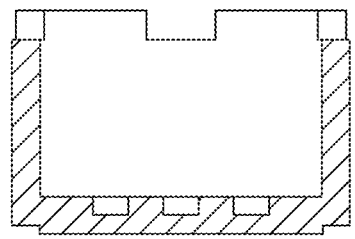
FIG. 6C is a sectional view of the batch purification system of FIG. 6A, taken along the line B-B.
Figure 6D:
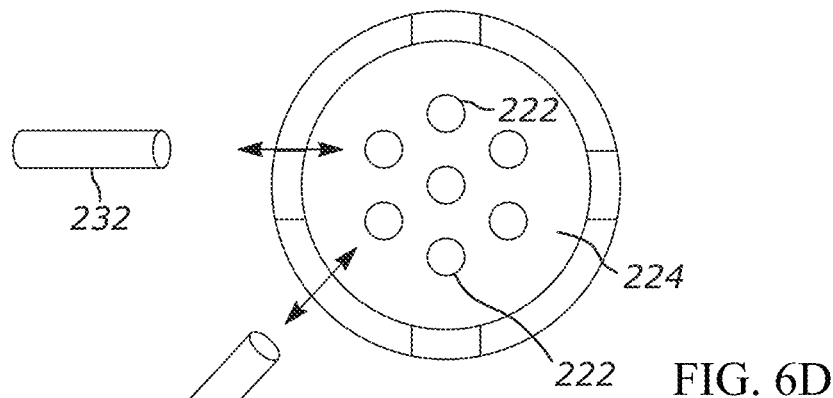
FIG. 6D is a bottom view of the crucible shown in FIG. 6A.
Figure 6A:
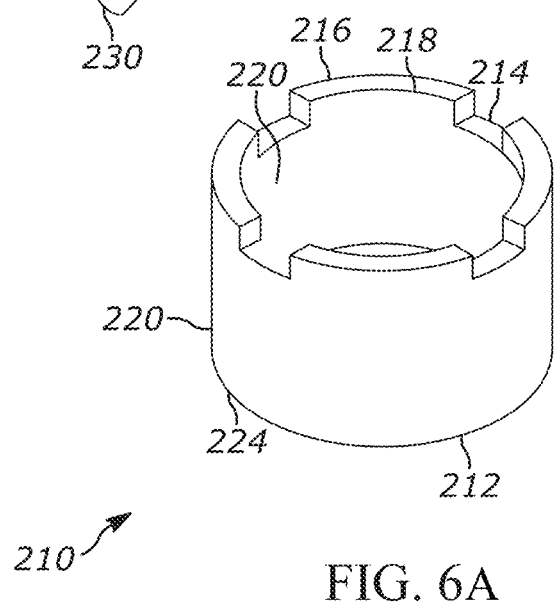
FIG. 6A is a side schematic view of a third exemplary batch purification system in accordance with the present invention.
Figure 7B:
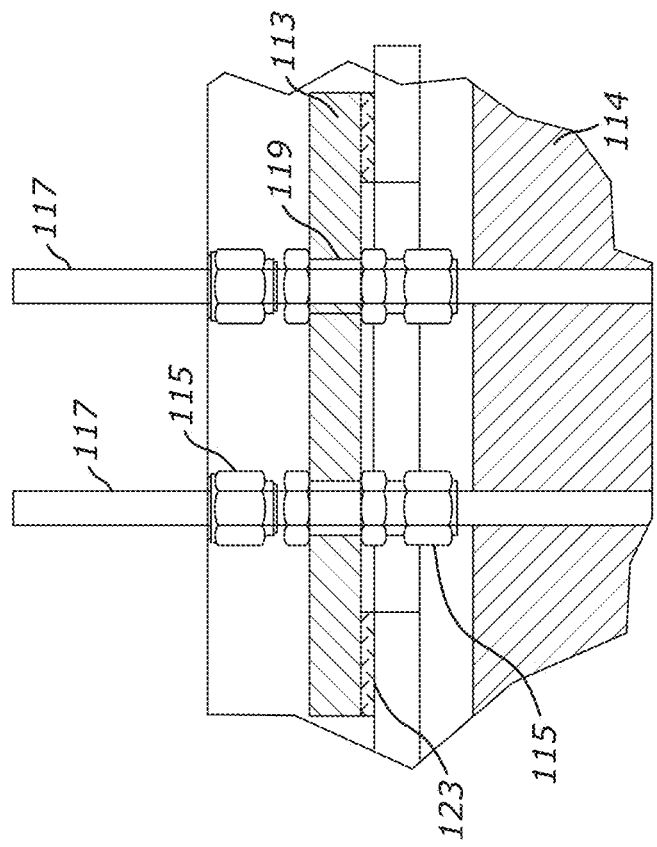
FIGS. 7A and FIG. 7B are schematic views of a fourth batch purification system in accordance with the present invention.
Figure 7A:
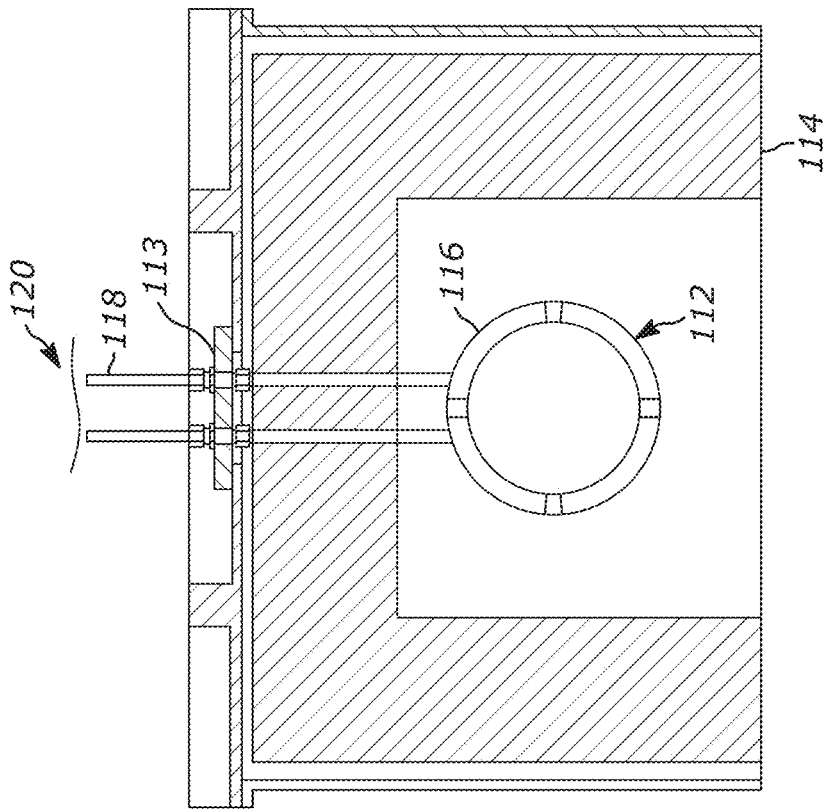
Figure 9:
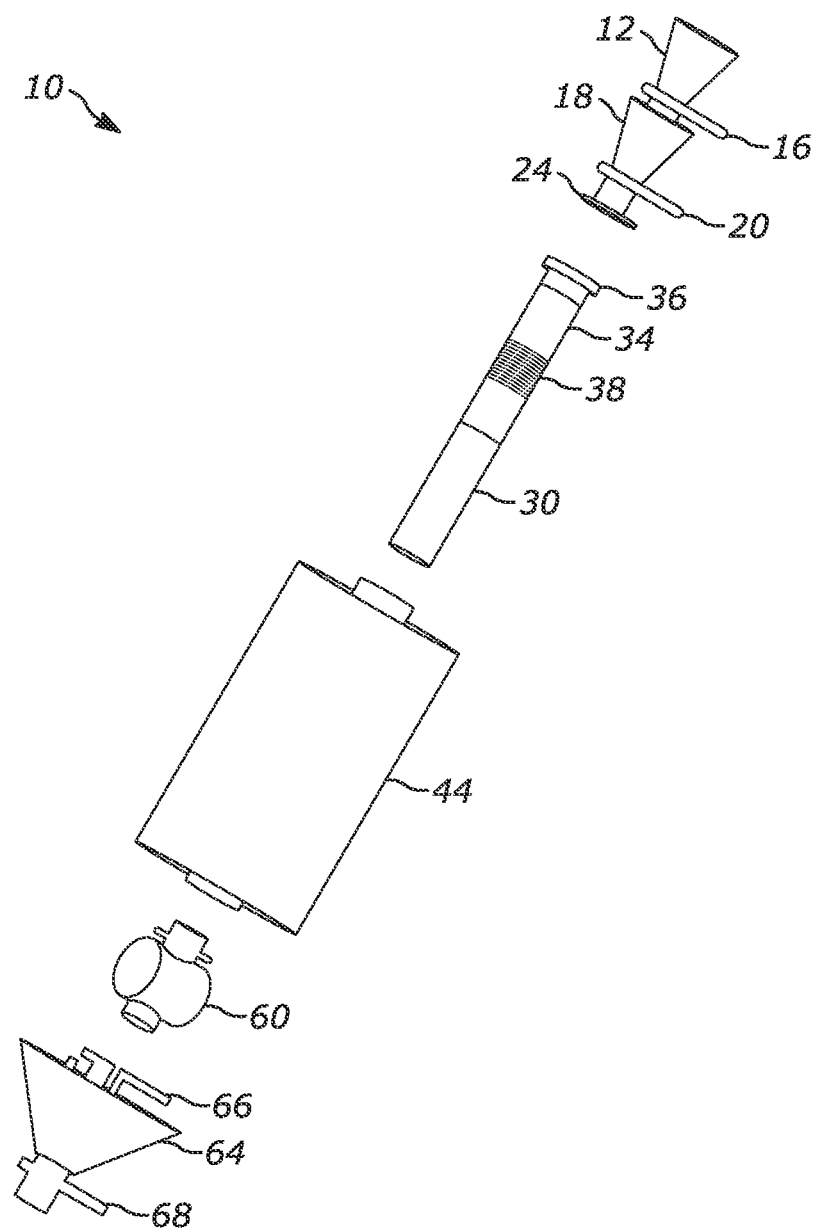
FIG. 9 is an exploded view of the embodiment of FIG. 2.

With reference to FIG. 5, in a second exemplary embodiment of the batch system, a second crucible 120 is formed in the same way as the first crucible 112 and in the same shape of the first crucible 112, thereby facilitating a stacking of one graphite crucible over the second graphite crucible. When a plurality of two or more crucibles are stacked in this way, the additive resultant heat enhances the heat and purification process while optimizing the energy costs. If desired, a cover 122 may be formed to fit over the opening of the top stacked crucible, thereby retaining the heat within the top crucible during heating thereof. A second coil 124 may also be wrapped around the second crucible 120 for magnetic inductive heating thereof.

In a third exemplary embodiment of the batch system shown in FIG. 6A through FIG. 6D (and similarly in FIG. 4), a third batch system 210 contains a first crucible 212 that may contain a square saw-tooth circumference 214 about an upper portion 216 of the first crucible 212. The saw-tooth circumference readily permits venting from each crucible so formed, there releasing volatile compounds exiting the graphite powder in the covered single or stacked crucibles. Yet further, the gaps presented by the saw-tooth configuration facilitate manipulation of stacked hot crucibles by way of automated forks during the processing; as the forks (not shown) are inserted through the gaps of the bottom crucible, for example, the adjacent upper crucible may be lifted from the bottom crucible.

With reference to FIGS. 6A through FIG. 6D, an interior 218 of the first crucible 212 is defined by a wall 220 of the first crucible 212. A plurality of cavities or recesses 222 may be formed in a bottom portion 224 of the interior 218 whereby each cavity or recesses 222 is formed to partially extend into the bottom portion 224 of the first crucible 212. Solid graphite rods 230, 232 may be inserted into the plurality of cylindrical cavities 222 whereby the solid graphite rods 230, 232 further function as thermomagnetic susceptors. Accordingly, it is believed that the solid graphite rods 230, 232 may provide more heating surface to the graphite powder and increase the heating efficiency, again by reciprocal dipole activity within the solid graphite rods 230, 232.

In sum, as the respective crucible is inductively heated during the purification of the graphite particles, the graphite crucible(s) and the optional graphite rods transfer(s) heat to the graphite particles contained within the crucible. As explained above, inductive heating causes absorption of magnetic flux lines by the graphite-containing crucibles, rotary shaft, rods, and other magnetic susceptors, and perhaps to a lesser extent but not by way of limitation, by the graphite particles and the resultant friction created by the magnetic dipoles. In general, the graphite particles are primarily conductively heated by the magnetic susceptors that are heated by magnetic inductive coils. In addition, heat transfer from the magnetic susceptors to the graphite particles also further enables efficient heating. It will be appreciated that in lieu of a crucible, other types of graphite holders, susceptors, or containers, including rods, flat plates, or cylinders, may also be molded from high-purity graphite in a known manner.

Method of Graphite Purification

In yet another aspect of the invention, a method of graphite purification is presented.

1. In a first step, spheroidized graphite powder is preferably selected based on desired design criteria.
2. Graphite powder is loaded in the top of a vertical continuous throughput process and gravitationally fed to an inductively heated furnace or graphite feed tube 30.
3. With reference to FIGS. 1 and 2, an inductive coil 38 is used to directly or indirectly heat graphite spheroidized particles or powder within an upper portion 72 of the graphite tube 30. As explained above, the graphite may be introduced to a vertical continuous throughput process 10 whereby the graphite particles are inductively heated as they pass through the graphite feed tube 30 and through the upper portion 72 surrounded by the inductive coil 38.

When heated in a temperature range of about 450 to 550 C, organic impurities may be released as volatile organic compounds (VOCs). When heated even further, in a temperature range of about 1700 to 2200 C, metal silicates, metal oxides, and other metallic impurities or minerals may be released as a fumed metal plasma. Both the VOCs and the metal plasma may be released through the vent 50 and directed into a wet scrubber for capture and management of these impurities.

Alternatively, if a batch system 110 is desired, as shown in FIGS. 4-7, at least one graphite crucible 112 or 212 (and optional graphite rods) may be inductively heated whereby when loaded with spheroidized graphite particles, for example, the particles physically contact the interior of the crucible 112 or 212 (and the surface of the optional graphite rods). The graphite particles are thereby directly heated by contact with the heated vessel or heated crucible (and optional rods) and indirectly heated by the magnetic flux that is attendant to the inductive heating of the crucible but also to the graphite particles that are contained within the crucible.

4. Cool the graphite particles by routing through areas of the purification process that are not heated, but are cooled. These include areas of the vertical continuous feed throughput system 10 within the graphite feed tube 30, such as the bottom portion 76 surrounded by radial fins 74, for example. Additionally, the jacketed titanium vessel 44 will provide cooling in areas of the tube 30 that are not heated by the coil 38. Yet further, if a cooling tower 52 is included, the jacketed tower will also cool the flow of graphite particles in the same way. Finally, the jacket discharge hopper 64, also cooled by the cooling system 310, as shown in FIG. 5, for example, will also cool the flow of graphite particles in the same way. With regard to batch systems and to avoid reaction with atmospheric oxygen, the crucibles 112 or 212, or other graphite-containing susceptors and receptacles, may be removed from the inductive heat by disconnecting from the power supply, and physically removing the crucible to a cooler environment once the graphite temperature falls below about 500 C or by removing the crucible to an oxygen-free environment. The graphite may also be cooled by simply permitting the crucible and graphite particles to cool in a crucible that is no longer inductively heated.

Non-Limiting Example

The present invention relates to graphite purification systems and methods, and more particularly, to furnaces heated by magnetic induction, that exhibit greater efficiency when converting electrical energy into usable heat energy.

The foregoing descriptions of specific embodiments of the present invention have been presented for purposes of illustration and description. They are not intended to be exhaustive or to limit the invention to the precise embodiments disclosed, and many modifications and variations are possible in view of the above description. It is understood that various omissions, and/or substitutions of equivalents are contemplated as circumstance may suggest or render expedient, without departing from the spirit or scope of the claims of the present invention.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function.

Benefits, other advantages, and solutions to problems have been described above with regard to specific embodiments. However, the benefits, advantages, solutions to problems, and any feature(s) that can cause any benefit, advantage, or solution to occur or become more pronounced are not to be constructed as a critical, required, sacrosanct, or an essential feature of any or all the claims.

After reading the disclosure, skilled artisans will appreciate that certain features are, for clarity, described herein in the context of separate embodiments, can also be provided in combination in a single embodiment. Conversely, various features that are, for brevity, described in the context of a single embodiment, can also be provided separately or in any sub-combination. Further, references to values stated in ranges include each and every value within that range.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A graphite purification system comprising:
   a vertical continuous graphite feed system;
   a vessel adapted to contain graphite particles;
   a graphite tube contained within said vessel for heating said graphite particles fed from said vertical continuous graphite feed system and passing through said graphite tube:
   an inductive coil wrapped about a first portion of said graphite tube and adapted for heating said graphite particles in said first portion of said graphite tube; and
   a cooling system adapted to cool said graphite particles in a second portion of said graphite tube.

2. The graphite purification system of claim 1 wherein said graphite purification system further comprises a first open-air hopper operably connected to a second environmentally-controlled hopper downstream of said first open-air hopper.

3. The graphite purification system of claim 2 wherein at least one of the first open-air hopper and the second environmentally-controlled hopper contains a gas inlet for injecting gas therein for fluidizing flow of said graphite particles.

4. The graphite purification system of claim 1 wherein said cooling system comprises:

a vertical column operably connected to said vessel, for vertical flow of graphite particles through said cooling system;
a cooling jacket encasing at least a portion of said vertical column; and
a coolant circulated through said cooling jacket.

5. The graphite purification system of claim 4 wherein said coolant is selectively circulated through said cooling jacket.

6. The graphite purification system of claim 4 further comprising a graphite particle temperature controller that measures temperature of graphite particles flowing therethrough, in operable communication with said cooling jacket.

7. The graphite purification system of claim 1 wherein said cooling system further comprises a graphite particle temperature controller for measuring temperature of graphite particles flowing therethrough, said cooling system in operable communication with said graphite particle temperature controller.

8. A graphite purification system comprising:
a vessel adapted to contain graphite particles;
a graphite tube contained within said vessel for heating graphite particles passing through said graphite tube;
an inductive coil wrapped about a first portion of said graphite tube for heating said graphite particles in said first portion of said graphite tube; and
a cooling system adapted to cool said graphite particles in a second portion of said graphite tube.

9. The graphite purification system of claim 8 wherein said graphite purification system is a continuous graphite feed system.

10. The graphite purification system of claim 8 wherein said graphite purification system is a vertical continuous graphite feed system.

11. The graphite purification system of claim 8 wherein said graphite purification system is a batch system.

12. The graphite purification system of claim 11 wherein said batch system comprises:
a first heated vessel for heating graphite particles; and
a ventilated oven containing said first heated vessel.

13. The graphite purification system of claim 12 wherein said first heated vessel is a crucible formed at least partially from graphite, and, said first heated vessel is inductively heated.

14. The graphite purification system of claim 13, wherein said first heated vessel further comprises: one or more recesses formed in a bottom of the first heated vessel, and, a corresponding number of rods seated in each of said one or more recesses, said rods comprised of graphite.

15. The graphite purification system of claim 12 further comprising a second heated vessel stacked upon said first heated vessel.

16. The graphite purification system of claim 15 wherein each of said first and second heated vessels are crucibles formed at least partially from graphite, and each heated vessel is inductively heated.

17. A method of purifying graphite particles comprising the steps of:
providing a vessel;
providing a graphite feed tube centrally disposed within the vessel;
vertically conveying graphite particles into and through the graphite feed tube:
inductively heating an upper portion of the graphite feed tube and thereby heating the graphite particles passing therethrough; and
cooling a lower portion of the graphite feed tube and the graphite particles passing therethrough.

18. The method of claim 17 further comprising the step of vertically continuously feeding graphite particles into said vessel.

19. The method of claim 17 wherein the step of loading the graphite particles into the vessel is conducted by batch loading the graphite particles into the vessel.

20. The method of claim 17 wherein a temperature of the graphite particles is controlled by measuring the temperature of the graphite particles during purification of graphite particles.

* * * * *

UNITED STATES PATENT AND TRADEMARK OFFICE
CERTIFICATE OF CORRECTION

Page 1 of 1

PATENT NO. : 12,215,029 B2
APPLICATION NO. : 18/615406
DATED : February 4, 2025
INVENTOR(S) : Palash Gangopadhyay et al.

It is certified that error appears in the above-identified patent and that said Letters Patent is hereby corrected as shown below:

On the Title Page

The provisional priority application listed on Page 2, Item (60), is incorrect. The correct provisional priority application number is: 63/369,257.

Signed and Sealed this
Eleventh Day of March, 2025

Coke Morgan Stewart
*Acting Director of the United States Patent and Trademark Office*